(12) United States Patent
Chen et al.

(10) Patent No.: US 10,295,767 B2
(45) Date of Patent: May 21, 2019

(54) SPOILER HEAT SINK DEVICE IN BELLY-TO-BELLY TRANSCEIVER

(71) Applicant: QUANTA COMPUTER INC., Taoyuan (TW)

(72) Inventors: Chao-Jung Chen, Taoyuan (TW); Yu-Nien Huang, Taoyuan (TW); Kuen-Hsien Wu, Taoyuan (TW); Kuo-Wei Lee, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 15/876,572

(22) Filed: Jan. 22, 2018

(65) Prior Publication Data

US 2019/0025529 A1 Jan. 24, 2019

Related U.S. Application Data

(60) Provisional application No. 62/534,847, filed on Jul. 20, 2017.

(51) Int. Cl.
*G02B 6/42* (2006.01)
(52) U.S. Cl.
CPC ........... *G02B 6/4269* (2013.01); *G02B 6/426* (2013.01); *G02B 6/428* (2013.01); *G02B 6/4284* (2013.01)
(58) Field of Classification Search
None
See application file for complete search history.

(56) References Cited

U.S. PATENT DOCUMENTS

2009/0296350 A1* 12/2009 Oki ..................... G02B 6/4201
361/709
2009/0296351 A1* 12/2009 Oki ..................... G02B 6/4201
361/709
2011/0044006 A1* 2/2011 Kim ..................... H05K 9/0058
361/715
2011/0317964 A1 12/2011 Downs
2012/0257355 A1 10/2012 Yi et al.
2014/0010552 A1* 1/2014 McColloch ............ H04B 10/14
398/139
2016/0081221 A1* 3/2016 Neer ..................... G02B 6/4246
439/78

FOREIGN PATENT DOCUMENTS

JP 2009152428 A 7/2009
JP 2010-85805 A * 4/2010

OTHER PUBLICATIONS

Extended European Search Report for EP Application No. 18172079.8, dated Oct. 4, 2018.

* cited by examiner

*Primary Examiner* — Michael Stahl
(74) *Attorney, Agent, or Firm* — Nixon Peabody LLP; Zhou Lu

(57) ABSTRACT

A transceiver cage and heat sink assembly for an optical switch is disclosed. A transceiver cage has an open front end to receive an optical transceiver and an opposite rear end. A front heat sink is mounted over the transceiver cage that includes a thermal interface material to contact a contact surface of an optical transceiver. A printed circuit board has a connector electronic circuit to receive a connector on the optical transceiver. A rear heat sink has a beveled surface facing the rear end of the transceiver cage. A cam structure in the front heat sink forces the transceiver into contact with the front heat sink. A metal foil layer is coated on the thermal interface material.

9 Claims, 6 Drawing Sheets

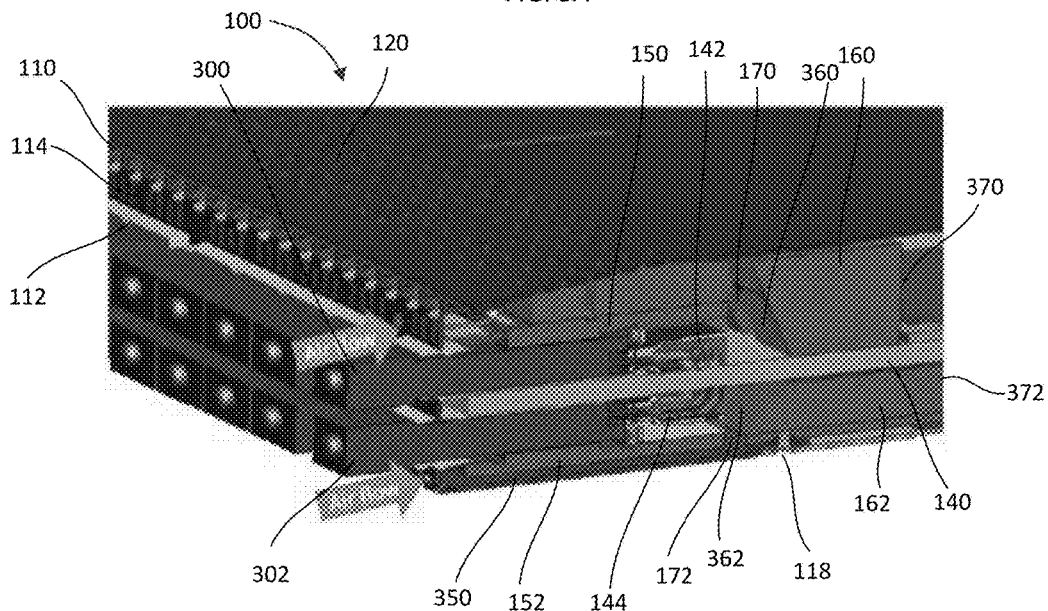

SPOILER HEAT SINK DEVICE IN BELLY-TO-BELLY TRANSCEIVER

PRIORITY CLAIM

The present application claims priority to U.S. Provisional Application No. 62/534,847, filed Jul. 20, 2017. The entirety of that application is hereby incorporated by reference.

TECHNICAL FIELD

The present disclosure relates generally to a heat sink structure for an optical transceiver. More particularly, aspects of this disclosure relate to a beveled heat sink with a cam structure and foil material to improve heat transmission, and reduce shearing damage from inserting an optical transceiver into a cage.

BACKGROUND

Distributed network systems have been widely adopted with the emergence of the cloud for computing applications. Network systems encompass numerous connected devices including servers, switches, and other components that exchange data. Connections between such devices have generally been wired connections in the past, but with the demand for speed and increased amounts of data, faster optical signal cables have been used. For example, recent transmission speeds in optical systems exceed 10 Gbps and reach 100 Gbps, thus addressing the need for increased data capability and speed.

Optical signals are sent and received through transmitters that include electronics that are necessary to relay optical signals. An optical transceiver transmits and receives optical signals through an optical connector mated by optically active devices of a light-emitting device and a light-receiving device, each made of semiconductor materials. An optical transceiver includes electronic components and an optical receptacle that receives the optical connector. One type of optical transceiver is a plug in optical transceiver. Such an optical transceiver is inserted into or removed from a transceiver cage provided on a printed circuit board in an optical switch device. The transceiver engages an electrical plug with an optical connector in the cage. The use of optical transceivers results in relatively more power consumption, and therefore heat generation by the electronic and optical devices in the optical transceiver. An effective heat-dissipating mechanism is thus required.

FIG. 1 shows an optical switch 10 for optical transceivers that includes a number of transceiver cages 12 mounted on the front side of a housing 14. The transceivers 12 each may receive optical transceivers for connection of optical signals to the optical switch 10. The transceivers are inserted into or removed from a front opening on one of the cages 12. The rear end of the transceiver has an electrical plug. The transceiver can electrically communicate with the host system on the optical switch 10 by engaging this plug with an optical connector provided on the opposite end of the cage. A series of heat sinks 16 is provided on top of the cages 12 to dissipate heat generated from the transceivers. A clip 18 binds the heat sink 16 with the cages 12.

The cage design allows the transceiver to contact the heat sink 16 and thereby remove heat generated by the transceiver. In such a cage design, the heat sink 16 is mounted over the transceiver, and thus the bottom of the heat sink 16 contacts the inserted transceiver to dissipate the heat. The heat sink 16 is designed with a bevel on the bottom side that faces the inserted transceiver. Thus, when transceiver is inserted into the cage 12, the transceiver contacts the bevel and lifts the heat sink 16, creating contact with the heat sink 16. Although the heat sink 16 has the clip 18 to produce a contact force between heat sink 16 and transceiver, the contact with the transceiver often has an inadequate contact surface. For example, roughness of the top surface of the transceiver and the beveled contact surface on the heat sink 16 affects the heat-transfer efficiency. Also, although both the contact surface of the transceiver and the heat sink 16 are metal objects, the contact surfaces between them are not smooth and therefore gaps exist on the surface. The gaps result in only a few points that function as contacts, which causes the heat conduction to have relatively low efficiency. For increasing the contact surface between the transceiver and heat sink 16, a thermal interface material may be used on the contact surface of the transceiver to improve the thermal contact resistance with the heat sink. However, in this design, when the transceiver is inserted into the cage, the shear force from the contact between the transceiver and the heat sink 16 may damage the thermal interface material.

Thus, there is a need for a heat sink configuration that allows better airflow to transfer heat away from an optical transceiver inserted in a transceiver cage. There is also a need for a transceiver cage configuration that allows maximum contact between a transceiver and a heat sink. There is also a need for a transceiver cage configuration that prevents shear damage from repeated insertion and removal of the transceiver from the transceiver cage.

SUMMARY

One disclosed example is an optical switch having a first transceiver cage that includes an open front end operable to receive an inserted optical transceiver and an opposite rear end. A printed circuit board has a connector circuit operable to connect to the optical transceiver. A forward heat sink is mounted over the first transceiver cage. The forward heat sink is in contact with the inserted optical transceiver. A rear heat sink is in proximity to the rear end of the first transceiver cage. The rear heat sink has a beveled surface facing the rear end of the first transceiver cage. A heat pipe couples the forward and rear heat sink together.

Another example is an optical switch having a transceiver cage that includes an open front end to receive an optical transceiver and an opposite rear end. A front heat sink is mounted over the transceiver cage and includes a thermal interface material to contact a contact surface of the optical transceiver. A printed circuit board has a connector electronic circuit to receive a connector on the optical transceiver. A cam structure in the front heat sink forces the transceiver into contact with the thermal interface material.

Another example is an optical switch having a transceiver cage that includes an open front end to receive an optical transceiver and an opposite rear end. A front heat sink is mounted over the transceiver cage and includes a thermal interface material to contact a contact surface of the optical transceiver. A printed circuit board has a connector electronic circuit to receive a connector on the optical transceiver. A rear heat sink has a beveled surface facing the rear end of the transceiver cage. A cam structure in the front heat sink forces the transceiver into contact with the thermal interface material. A metal foil layer is coated on the thermal interface material.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 3A is a perspective cutaway view of the transceiver cage and heat sinks in FIG. 2, with transceivers inserted in the transceiver cage;

FIG. 3B is a side view of the transceiver cage and heat sinks in FIG. 2 with the transceivers inserted;

Figure 1:
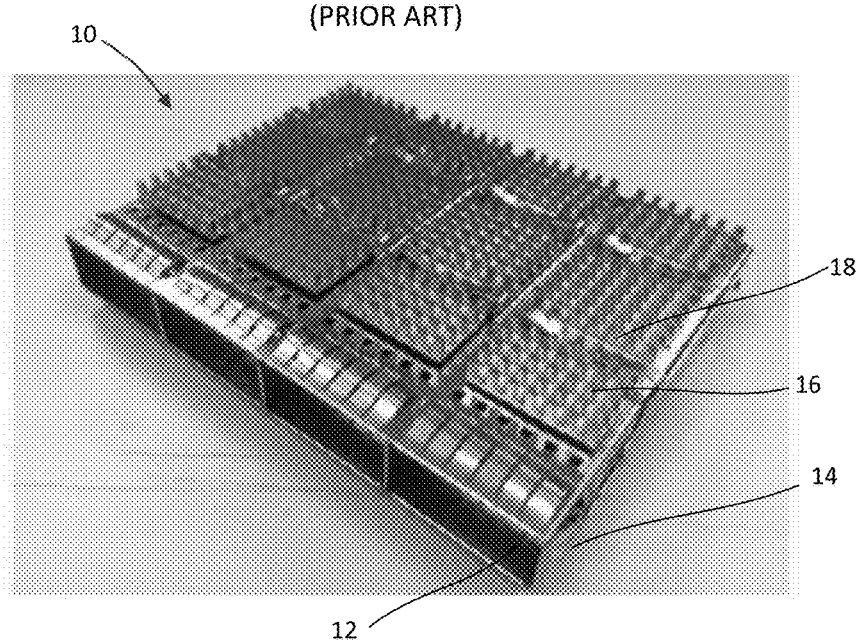
FIG. 1 is a perspective view of a prior art optical switch.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Figure 2:
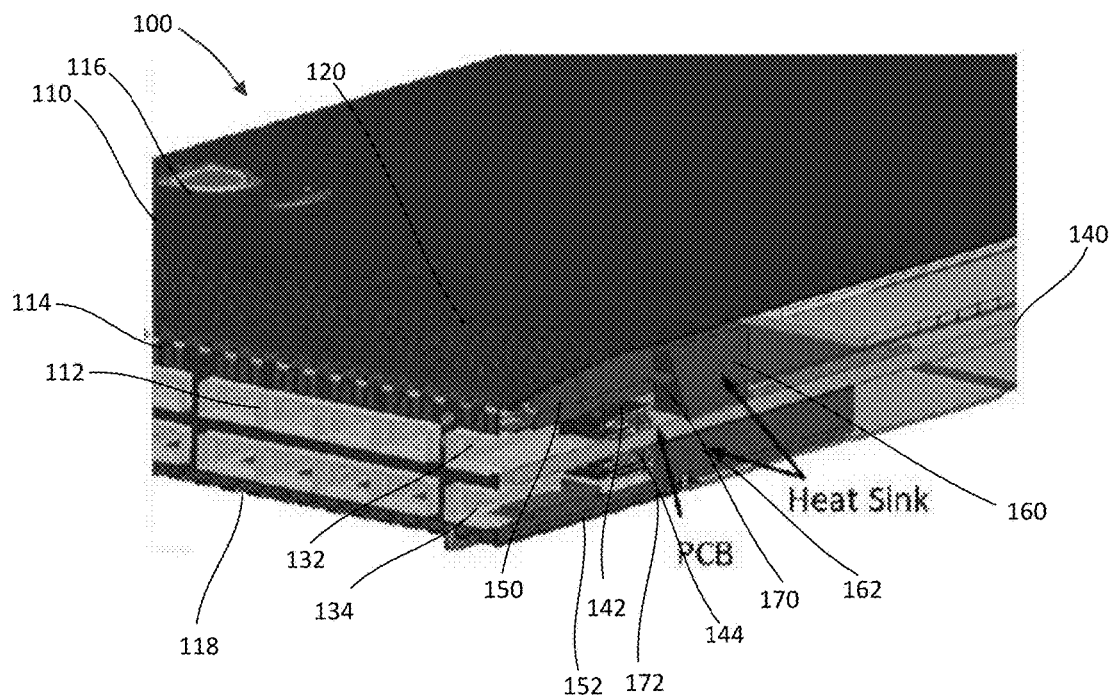
FIG. 2 is a perspective cutaway view of a transceiver cage in an optical switch with heat sinks shaped to allow better air flow.

FIG. 2 is a cutaway perspective view of an optical switch 100. The optical switch 100 includes a housing 110 that has a set of transceiver cages 112 mounted on a faceplate 114 for insertion of optical transceivers. The set of transceiver cages 112 include two rows of cages that are in a belly-to-belly configuration. A top plate 116 of the housing 110 includes apertures through which a series of heat sink vanes 120 extend from. The heat sink vanes 120 are attached to heat sinks. The heat sinks that include the heat sink vanes 120 contact inserted transceivers in the transceiver cages 112, and conduct heat generated from the transceivers to ambient air outside of the housing 110. A clip (not shown) creates a contact force between the heat sinks and transceivers inserted in the transceiver cages 112. An opposite bottom panel 118 of the housing 110 encloses the set of transceiver cages 112.

As explained above, the transceiver cages 112 include a series of belly-to-belly cages that include a top cage 132 and a bottom cage 134, each of which can hold an optical transceiver. A printed circuit board 140 is located at the ends of the top and bottom cages 132 and 134 to support connector electronics 142 and 144, which are mounted on opposite sides of the printed circuit board 140. Inserted transceivers in the top and bottom cages 132 and 134 contact the connector electronics 142 and 144. The connector electronics 142 and 144 receive optical signals and transmit optical signals to the respective transceivers that are inserted in one of the top and bottom cages 132 and 134.

A top forward heat sink 150 is mounted in the housing 110 to contact a transceiver inserted in the top cage 132. A bottom forward heat sink 152 is mounted in the housing 110 to contact a transceiver inserted in the bottom cage 134. The top forward heat sink 150 is one of the heat sinks that support the heat sink vanes 120. A top rear heat sink 160 is located near the rear end of the top cage 132 and a bottom heat sink 162 is located near the rear end of the bottom cage 134. A heat pipe 170 is inserted in the top forward heat sink 150 and conveys heat between the top forward heat sink 150 and the top rear heat sink 160. Another heat pipe 172 is inserted in the bottom forward heat sink 152 and conveys heat between the bottom forward heat sink 152 and the bottom rear heat sink 162. In this example each of the heat pipes 170 and 172 are a copper base exterior that contain a two phase liquid to allow transfer between heat sinks.

FIGS. 3A and 3B are side views of the optical switch 100 in FIG. 2, and show an optical transceiver 300 inserted in the top cage 132. Like the elements in FIG. 2, those elements in FIGS. 3A and 3B are labeled with identical element numbers. Another transceiver 302 is inserted in the bottom cage 134, as shown in FIGS. 3A-3B. As shown in FIG. 3B, the top cage 132 includes an open front end 310 and an opposite rear end 312 that is in proximity to the connector electronics 142. A top panel 314 includes an aperture 316 that allows the transceiver 300 to contact the top forward heat sink 150. A bottom panel 318, along with the side walls and the top panel 314 form the top cage 132 that holds the inserted transceiver 300.

Similarly, the bottom cage 134 includes an open front end 320 and an opposite rear end 322 that is in proximity to the connector electronics 144. A bottom panel 324 includes an aperture 326 that allows the transceiver 302 to contact the bottom forward heat sink 152. A top panel 328, along with the side walls and the bottom panel 324, form the bottom cage 134 that holds the inserted transceiver 302.

As shown in FIG. 3B, the transceiver 300 has a roughly rectangular body 330 including a contact surface 332 and a rear connector interface 334 that connects to the connector electronics 142 mounted on the top of the circuit board 140 when the transceiver 300 is inserted in the top cage 132. The transceiver 302 has a roughly rectangular body 340 that includes a contact surface 342, and a rear connector interface 344 that connects to the connector electronics 144 mounted on the bottom of the circuit board 140 when the transceiver 302 is inserted in the bottom cage 134. The optical transceivers 300 and 302 each have an optical connector, transceiver optics, an internal printed circuit board, and thermal interface material.

As shown in FIGS. 3A-3B, a gap 350 is created between the bottom forward heat sink 152 and the bottom panel 118 of the housing 110. Some heat generated from the electronic components on the transceiver 300 are conducted to the top forward heat sink 150, and convected outside the housing 110 by the heat vanes 120 shown in FIG. 2. Heat from the electronic components of the transceiver 302 is conducted to the bottom forward heat sink 152. Heat from both heat sinks 150 and 152 is conveyed by the heat pipe 170 to the heat sinks 160 and 162.

Figure 4A:
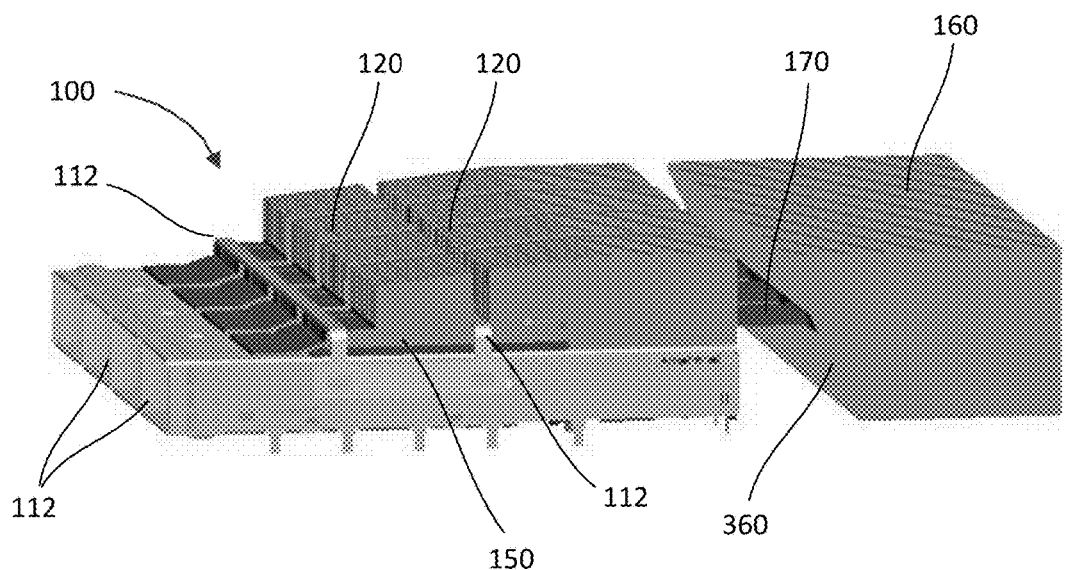
FIG. 4A is a top perspective view of the optical switch in FIG. 2 showing the transceiver cage and heat sinks with exterior vanes.
Figure 4B:
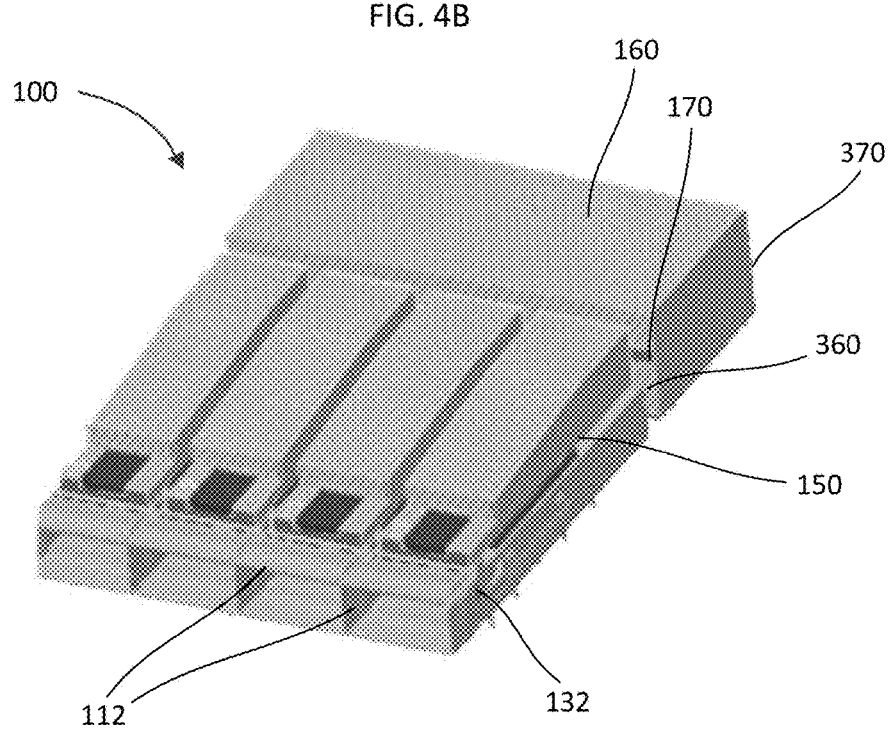
FIG. 4B is a top cutaway perspective view of the optical switch in FIG. 2 showing the transceiver cage and heat sinks without exterior vanes for clarity.
Figure 4C:
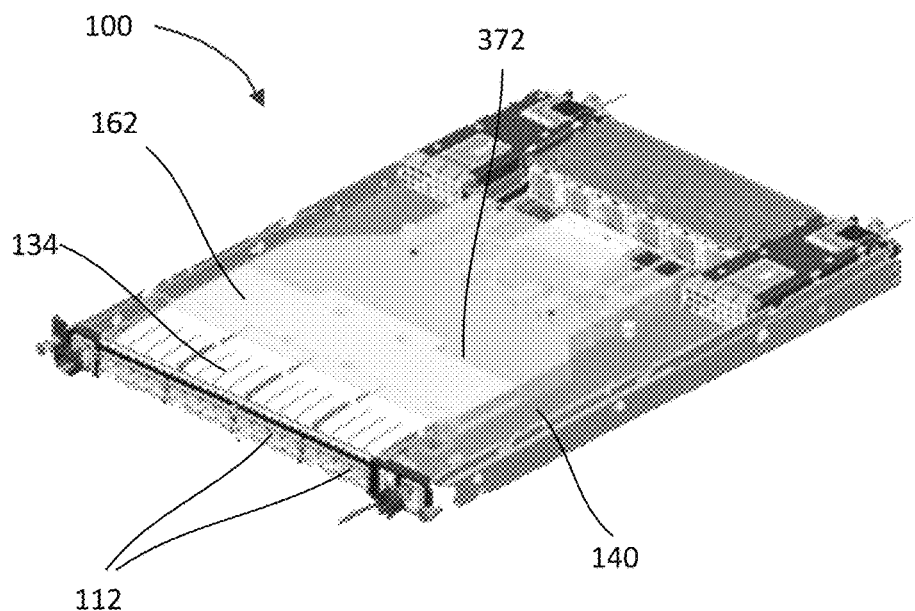
FIG. 4C is a bottom cutaway perspective view of the optical switch in FIG. 2 showing the transceiver cage and heat sinks.
Figure 4D:
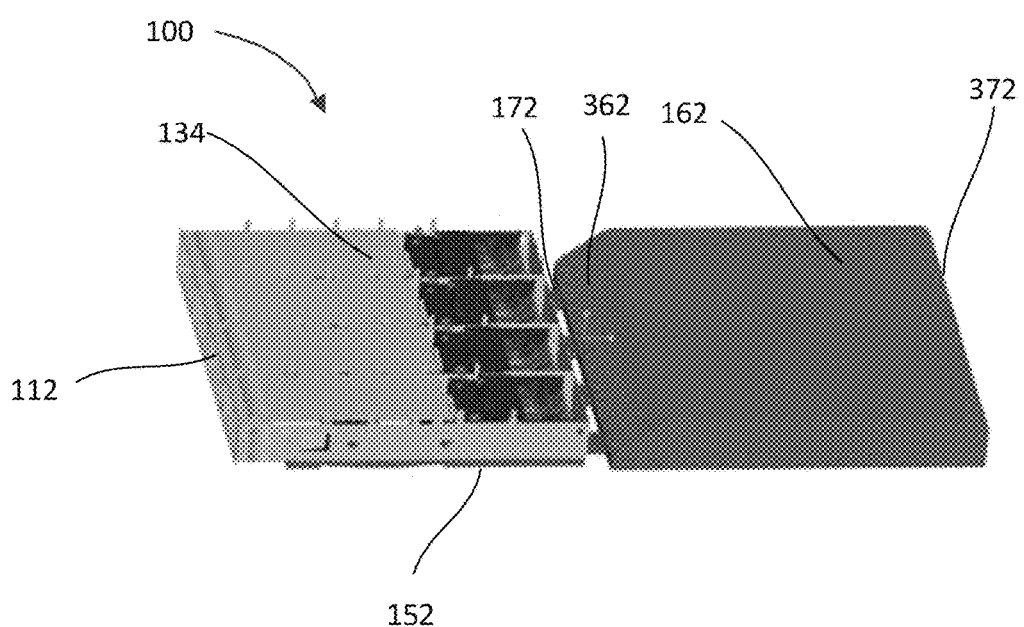
FIG. 4D is a close-up perspective view of the bottom heat sinks of the optical switch in FIG. 3.

FIG. 4A is a top perspective view of the optical switch 100 showing the arrangement of the exterior of the top heat sinks 150 and 160 with vanes 120. FIG. 4A shows a clip 410 that is used to create a contact force between the heat sinks 150 and the transceiver cage 112. FIG. 4B is a top cutaway perspective view of the optical switch 100 showing the arrangement of the top heat sinks 150 and 160 without the external vanes for clarity. FIG. 4C is a bottom cutaway perspective view of the optical switch 100 showing the arrangement of the bottom heat sinks 152 and 162. FIG. 4D is a close-up view of the rear bottom heat sink 162 and the transceiver cages 112. Like the elements in FIGS. 2, 3A and 3B, those elements in FIGS. 4A to 4D are labeled with identical element numbers. The rear heat sinks 160 and 162 shown in FIGS. 2-4, allow the cooling capacity of the transceiver cage configuration in the optical switch 100 to be increased. As shown in FIGS. 3-4, the top rear heat sink 160 has a beveled surface 360 facing the top cage 132 and the inserted transceiver 300. An opposite rear surface 370 of the top rear heat sink 160 conveys the air flow from the top rear heat sink 160 out the back of the housing 110. The bottom rear heat sink 162 has a beveled surface 362 that faces the bottom cage 134 and the inserted transceiver 302. An opposite rear surface 372 of the bottom rear heat sink 162 conveys the air flow from the bottom rear heat sink 162 out the back of the housing 110. Cooling devices such as fans may be installed in the middle of the housing 110 to the rear of the heat sinks 160 and 162 to facilitate air flow from the heat sink opposite rear surfaces 370 and 372.

The belly-to-belly transceiver structure design shown in FIGS. 3-4 includes the beveled surfaces 360 and 362 of the top and bottom rear heat sinks 160 and 162 respectively. The beveled surfaces 360 and 362 guide air flow and increase the surface area of the heat sinks to let airflow spread to all of the area of the heat sinks 160 and 162. The heat sinks 160 and 162 allow for a greater area for conduction of heat from the heat pipes 170 and 172. FIG. 3B shows arrows 380 that represent air flow at the top of the inserted transceiver 300 that flows through the heat sink 150 and the heat sink 160. FIG. 3B also shows arrows 382 that represent air flow through the heat sink 152 and the heat sink 162.

Figure 5A:
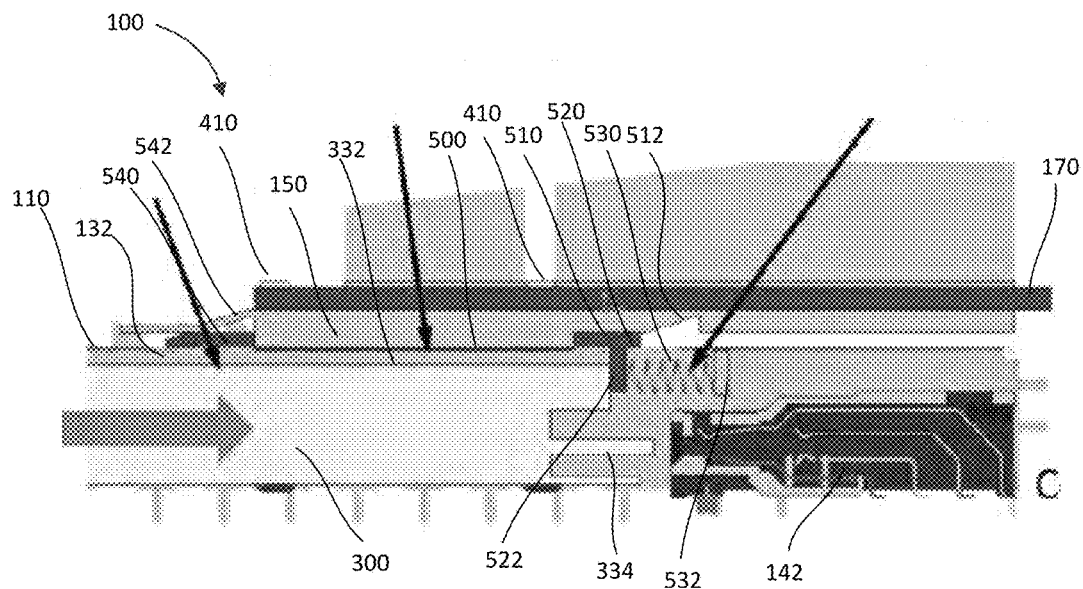
FIG. 5A is a side view of the transceiver cage in FIG. 2 where the transceiver is partially inserted in the transceiver cage.
Figure 5B:
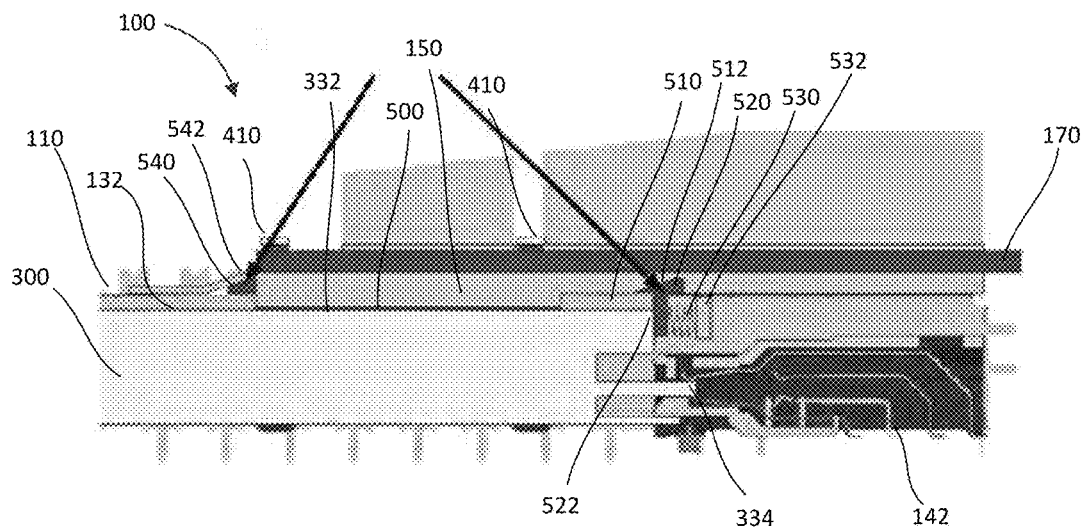
FIG. 5B is a side view of the transceiver cage in FIG. 2, with a cam structure to facilitate contact between the transceiver and the heat sink when the transceiver is fully inserted.

The transceiver and cage structure in the housing 110 of the optical switch 100 in FIG. 2 has several other features that improve the contact between an inserted transceiver such as the transceiver 200 and the heat sink 232, and prevent harmful shear forces. FIG. 5A is a side close-up view of the optical switch 100 in FIG. 2 with the transceiver 300 partially inserted in the cage 132. FIG. 5B is a side close-up view of the optical switch 100 in FIG. 2 with the transceiver 300 fully inserted in the top cage 132. Like the elements in FIGS. 2-4, those in FIGS. 5A-5B are labeled with identical element numbers.

As shown in FIG. 5A, there is a gap between the contact surface 332 of the transceiver 300 and the heat sink 150 when the transceiver 300 is partially inserted in the top cage 132. The rear connector interface 334 in FIG. 5A is connected with the connector electronics 142, as shown in FIG. 5B when the transceiver is fully inserted in the top cage 132. A layer of thermal interface material 500 is mounted on the bottom of the heat sink 150. The thermal interface material 500 contacts the contact surface 332 of the transceiver 300, and conducts heat to the heat sink 150 when the transceiver 300 is fully inserted in the top cage 132, as shown in FIG. 5B. As will be explained in reference to FIGS. 5A-5B, the housing 110 includes a dual cam structure that facilitates contact between the transceiver 300 and the heat sink 150 when the transceiver 300 is fully inserted in the top cage 132.

The bottom of the heat sink 150 includes a forward slot 510 and a rear beveled slot 512 that guides the motion of the heat sink 150 relative to a cam structure 520. The cam structure 520 is fixed vertically, and the heat sink 150 moves vertically as guided by the slots 510 and 512 in relation to the cam structure 520. The cam structure 520 has a contact surface 522 that abuts the end of the transceiver 300. One end of a spring 530 contacts the cam structure 520. The opposite end of the spring 530 is fixed to a stop 532. As shown in FIG. 5A, when the transceiver 300 is partially inserted in the top cage 132, a small gap exists between the thermal interface material 500 and the transceiver 300. The cam structure 520 is in contact with the slot 510 and thus the heat sink 150 is in a raised position relative to the transceiver 300. As shown in FIG. 5B, after pushing the transceiver 300 to the end of its stroke in the top cage 132 the connector 334 mates with the connector electronics 142. The cam structure 520 is moved relative to the slot 512, and thus the heat sink 150 drops down relative to the transceiver 300. In the dropped position, the thermal interface material 510 will contact the contact surface 332 of the transceiver 300

The cam structure 520 is pushed from the forward slot 510 as shown in FIG. 5A into the beveled slot 512, as shown in FIG. 5B, by pushing the transceiver 300 into the top cage 132. Thereby, the thermal interface material 500 is moved down to contact the contact surface 332. The clip 410 binds the heat sink 150 and provides downward pressure on the heat sink 150. The force of the spring 530 exerts to push the cam structure 520 forward is larger than the downward pressure by the clip 410. Thus, the heat sink 150 is lifted to create a gap between itself and the transceiver 300 as shown in FIG. 5A. In FIG. 5B, the cam structure 520 is pushed back to the initial position in the forward slot 510. The clip 410 provides downward pressure to push the heat sink 150 down to contact the transceiver. As shown in FIG. 5B, when the transceiver 300 is fully inserted in the top cage 132, the spring 530 is compressed between the contact surface 522 of the cam 520 and the stop 532. The transceiver 300 uses the spring 530 to produce a thrust propelling the cam structure 520 back to the initial position in the forward slot 510, when the transceiver 300 is pulled out of the top cage 132. Thus, the heat sink 150 is lifted away from the transceiver 300. This prevents the shear force that may damage the thermal interface material 500 in the contact stroke of inserting or pulling out the transceiver 300.

A forward cam structure 540 of the cam structure 500 is pushed between an initial position relative to a beveled forward plate 542, when the transceiver 300 is not fully inserted as shown in FIG. 5A, and a locked position as shown in FIG. 5B. The forward cam structure 540 further pushes the heat sink 150 down so the contact surface 332 contacts the thermal interface material 500.

A similar dual cam structure 400 to the cam structure for the top cage 132 as shown in FIGS. 5A-5B, is located on the bottom cage 134 shown in FIG. 4. The cam structure 400 pushes the heat sink 152 in an upward direction in the bottom cage 134 to force contact between the contact surface 342 and the bottom forward heat sink 152. A layer of thermal interface material (not shown) also is attached to the bottom forward heat sink 152 to provide greater contact with the contact surface 342.

Figure 6A:
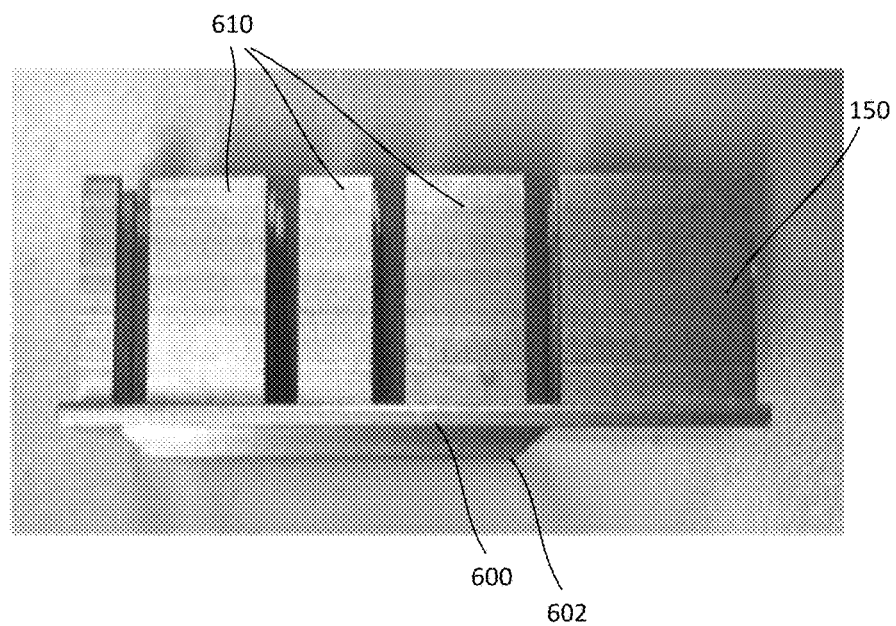
FIG. 6A is a perspective view of one of the heat sinks in FIG. 2.
Figure 6B:
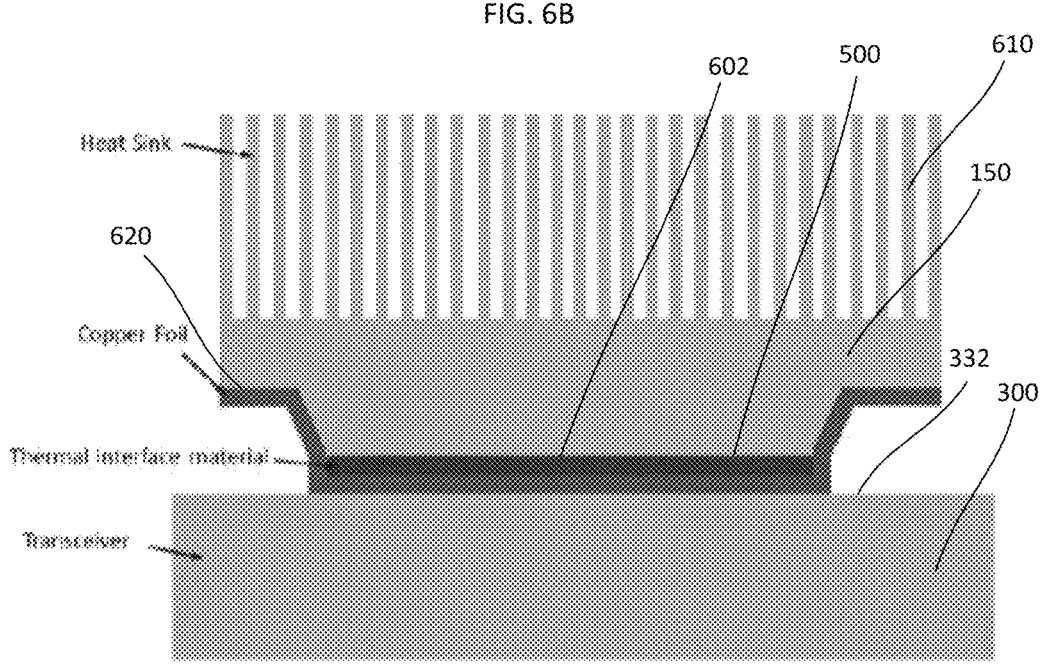
FIG. 6B is a side view of the heat sink in FIG. 6A with thermal interface material and a protective foil.

As explained above, typical metal contact between the transceiver 300 and the thermal interface material 500 on the heat sink 150 in FIGS. 5A-5B causes damage to the thermal interface material 500 by repeated contact when inserting and removing the transceiver 300. This degrades the contact between the transceiver 300 and the thermal interface material 500, thereby reducing heat flow to the heat sink 150 in FIGS. 5A-5B. FIGS. 6A and 6B are perspective and close up side views of the heat sink 150 shown in FIGS. 5A-5B. FIG. 6B shows the heat sink 150 that includes a base 600 that has a bottom surface 602. The base 600 supports clusters of cooling vanes 610 that assist in dissipating heat from the heat sink 150.

As shown in FIG. 6B, the heat sink 150 includes a metal foil 620 on the bottom surface 602 between the thermal interface material 500 and the contact with the contact surface 332 of the transceiver 300. In this example, the metal foil 620 is copper but other like materials such as aluminum may be used. The thermal interface material 500 is protected from shear force damage from the transceiver 300 being inserted and removed from the top cage 132 as shown in FIG. 5B. The metal foil 620 also increases the contact between the contact surface 332 of the transceiver 300 and the heat sink 150. Similarly, a metal foil is also inserted on the thermal interface material on the bottom forward heat sink 152 shown in FIG. 4, to increase contact with the contact surface 342 and protect the thermal interface material on the heat sink 152 from shear force damage.

Thus, the above described transceiver cage and heat sink structure in FIGS. 2-6 allows for more efficient heat transmittal to the heat sinks. The dual cam structure in combination with the thermal interface materials causes greater contact between the transceiver and the heat sink thus increasing heat transmittal when a transceiver is inserted in a cage. The cam structure protects the thermal interface surface by causing the heat sink to be lifted up when the transceiver is removed from the cage. The metal foil covering the thermal interface material protects the thermal interface material from damage from shear force by metal wear resistance.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer; is typically of a non-transitory nature; and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media that can be used to store desired information. Computer-readable storage media can be accessed by one or more local or remote computing devices, e.g., via access requests, queries or other data retrieval protocols, for a variety of operations with respect to the information stored by the medium.

The terminology used herein is for the purpose of describing particular embodiments only, and is not intended to be limiting of the invention. As used herein, the singular forms "a," "an" and "the" are intended to include the plural forms as well, unless the context clearly indicates otherwise. Furthermore, to the extent that the terms "including", "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An optical switch, comprising:
   a first transceiver cage having an open front end and an opposite rear end, the open front end operable to receive an inserted optical transceiver;
   a printed circuit board having a connector circuit operable to connect to the optical transceiver;
   a forward heat sink mounted over the first transceiver cage, the forward heat sink in contact with the inserted optical transceiver;
   a rear heat sink in proximity to the rear end of the first transceiver cage, the rear heat sink having a beveled surface facing the rear end of the first transceiver cage; and
   a heat pipe coupling the forward and rear heat sink together.

2. The optical switch of claim 1, wherein the forward heat sink includes a thermal interface material to contact the transceiver when the transceiver is inserted in the first transceiver cage.

3. The optical switch of claim 2, wherein a metal foil is coated over the thermal interface material.

4. The optical switch of claim 3, wherein the metal foil is copper.

5. The optical switch of claim 2, wherein the forward heat sink includes a slot that holds a cam structure moveable between a forward position and a rear position.

6. The optical switch of claim 5, wherein the forward heat sink holds a stop and a spring between the stop and the cam structure.

7. The optical switch of claim 1, further comprising:
   a second transceiver cage under the first transceiver cage, the second transceiver cage having an open front end operable to receive an inserted optical transceiver and an opposite rear end; and
   a bottom forward heat sink located under the second transceiver cage operable to contact the transceiver inserted in the second transceiver cage.

8. The optical switch of claim 7, further comprising a rear heat sink in proximity to the rear end of the second transceiver cage.

9. An optical switch, comprising:
   a transceiver cage having an open front end and an opposite rear end, the open front end operable to receive an optical transceiver;
   a front heat sink mounted over the transceiver cage, the front heat sink including a thermal interface material to contact a contact surface of the optical transceiver;
   a printed circuit board having a connector electronic circuit to receive a connector on the optical transceiver;
   a rear heat sink in proximity to the rear end of the transceiver cage, the rear heat sink having a beveled surface facing the rear end of the transceiver cage;
   a cam structure in the front heat sink that forces the transceiver into contact with the thermal interface material; and
   a metal foil layer coated on the thermal interface material.

\* \* \* \* \*